(12) United States Patent
Shibata et al.

(10) Patent No.: US 8,382,022 B2
(45) Date of Patent: Feb. 26, 2013

(54) SPINNING REEL FOR FISHING

(75) Inventors: Takashi Shibata, Higashikurume (JP); Masashi Fujioka, Higashikurume (JP)

(73) Assignee: Globeride, Inc., Higashikurume-Shi, Tokyo (JP)

(*) Notice: Subject to any disclaimer, the term of this patent is extended or adjusted under 35 U.S.C. 154(b) by 220 days.

(21) Appl. No.: 13/009,554

(22) Filed: Jan. 19, 2011

(65) Prior Publication Data
US 2011/0174909 A1    Jul. 21, 2011

(30) Foreign Application Priority Data

Jan. 19, 2010  (JP) ............................. P.2010-009505
Dec. 22, 2010  (JP) ............................. P.2010-285847

(51) Int. Cl.
*A01K 89/01*    (2006.01)

(52) U.S. Cl. ........ 242/319; 242/247; 242/257; 242/261; 242/262

(58) Field of Classification Search ................ 242/247, 242/257, 261, 262, 319
See application file for complete search history.

(56) References Cited

U.S. PATENT DOCUMENTS

| | | | | |
|---|---|---|---|---|
| 6,457,662 B1 * | 10/2002 | Sato | ............................. | 242/247 |
| 6,679,445 B2 * | 1/2004 | Morise et al. | ................ | 242/322 |
| 6,786,442 B2 * | 9/2004 | Sugawara | ..................... | 242/231 |
| 6,874,719 B2 * | 4/2005 | Ikuta | ............................. | 242/319 |
| 2002/0056776 A1 * | 5/2002 | Sugawara | ..................... | 242/231 |
| 2002/0088889 A1 * | 7/2002 | Morise et al. | ................ | 242/322 |

FOREIGN PATENT DOCUMENTS

| | | | |
|---|---|---|---|
| EP | 0 992 190 A1 | | 4/2000 |
| EP | 1 068 800 A2 | | 1/2001 |
| JP | 11276042 A | * | 10/1999 |
| JP | 2002-354974 A | | 12/2002 |
| JP | 4057254 B2 | | 12/2007 |
| JP | 2010178629 A | * | 8/2010 |

OTHER PUBLICATIONS

Extended European Search Report dated Jul. 21, 2011.

* cited by examiner

*Primary Examiner* — Emmanuel M Marcelo
(74) *Attorney, Agent, or Firm* — McGinn IP Law Group, PLLC (57) ABSTRACT

A spinning reel for fishing includes: a reel body including a front portion; a handle provided in the reel body; a cap-shaped cover body including a surrounding wall mounted in the front portion of the reel body; a spool on which a fishing line is to be wound; a rotor including a fishing line guide part, the rotor being rotated by the rotational manipulation of the handle to wind the fishing line on the spool; a driving part passing through the cover body and transmitting the rotation of the handle to the rotor; a support part provided in the front portion of the reel body and supporting the driving part; and a magnetic seal device mounted in the cover body and including a magnet, a cylindrical magnetic body forming a magnetic circuit between the magnetic body and the magnet and magnetic fluid maintained between the magnet and the magnetic ring.

12 Claims, 12 Drawing Sheets

SPINNING REEL FOR FISHING

BACKGROUND ART

The disclosure relates to a spinning reel for fishing for reeling a fishing line in a spool by the rotational operation of a rotor having a fishing line guide part, which is cause by the rotational manipulation of a handle provided in a reel body.

A spinning reel for fishing reels a fishing line in a spool via a fishing line guide part of a rotor, which is associated with, and rotated by, the rotational manipulation of a handle.

A fishing spinning reel is used outdoors, the severe environment where sea water or fresh water may easily wet, or permeate, the reel. Thus, the corrosion of a support portion of an operation member, which deteriorates the rotational performance of the reel, should be prevented.

Japanese Patent No. 4057254 discloses the structure for achieving the waterproof of a bearing part of an operation member by providing a retaining member with a seal member. The retaining member retains the bearing part of the operation member in the front portion of the reel body. The seal member includes a contact lip portion being in contact with a boss part of the rotor.

SUMMARY

However, according to the structure disclosed in Japanese Patent No. 4057254, because the seal member made of a flexible body is in contact with a rotational body (the boss part of the rotor), the frictional force (seal resistance) between the seal member and the rotational body increases, and the moment of inertia also becomes higher. Thus, there is a problem of worsening the rotational performance of the rotor, such as the rotational sensitivity or the smoothness.

Further more, the rotor of a spinning reel for fishing includes several devices or components mounted such as a fishing line guide part for guiding a fishing line into a spool, a press retaining device for shifting, and then retaining, the fishing line guide part between a fishing line winding state and a fishing line releasing state, a reverse device for retrieving from the fishing line releasing state to the fishing line winding state, and a bail for conveying the fishing line to the fishing line guide part, being accompanied by the reverse retrieving from the fishing line releasing state to the fishing line winding state. Accordingly, the weight of the rotor itself increases, and, thus, the moment of inertia also becomes higher. In addition to the seal resistance, the increased moment of inertia due to the increased weight is considered as a factor deteriorating the rotational sensitivity of the rotor.

One aspect of the exemplary embodiment is encouraged in consideration of these problems, and is to provide a spinning reel for fishing for improving the rotational performance of a rotor by reducing the moment of inertia of the rotor.

The aspect of the exemplary embodiment provides the following arrangements:

(1) A spinning reel for fishing comprising:
   a reel body including a front portion;
   a handle provided in the reel body;
   a spool on which a fishing line is to be wound;
   a rotor that includes a cylindrical portion accommodating the front portion of the reel body and a fishing line guide part, the rotor being rotated by the rotational manipulation of the handle to wind the fishing line on the spool, an opening being formed radially through the cylindrical portion of the rotor;
   a driving part transmitting the rotation of the handle to the rotor;
   a support part provided in the front portion of the reel body and supporting the driving part; and
   a magnetic seal device arranged between the driving part and the support part.

(2) The spinning reel according to (1) further comprising a cap-shaped cover body including a surrounding wall mounted in the front portion of the reel body,
   wherein the magnetic seal device is mounted in a front portion of the cover body, and
   wherein the driving part passes through the front portion of the cover body.

(3) The spinning reel according to (2), wherein the magnetic seal device is arranged on a surface substantially flush with the front surface of the cover body, as not to protrude over the surface.

(4) The spinning reel according to (3), wherein the magnetic seal device includes a magnet, a cylindrical magnetic body forming a magnetic circuit between the magnetic body and the magnet and magnetic fluid maintained between the magnet and the magnetic ring.

(5) The spinning reel according to (3) further comprising a rolling type one-way clutch allowing the rotation of the driving part in one direction and preventing the rotation of the driving part in the other direction,
   wherein the magnetic body functions as an inner race of the one-way clutch.

(6) The spinning reel according to (1), wherein the opening of the rotor has a rectangular shape.

(7) The spinning reel according to (1), wherein the rotor includes a triangle-shaped notch opening.

(8) The spinning reel according to (1), wherein the rotor includes a pair of arms formed at opposite sides of the cylindrical portion of the rotor, and a curved reinforcing member connecting the cylindrical portion of the rotor and the pair of the arms.

(9) A spinning reel for fishing comprising:
   a reel body including a front portion;
   a handle provided in the reel body;
   a cap-shaped cover body including a surrounding wall mounted in the front portion of the reel body;
   a spool on which a fishing line is to be wound;
   a rotor including a fishing line guide part, the rotor being rotated by the rotational manipulation of the handle to wind the fishing line on the spool;
   a driving part passing through the cover body and transmitting the rotation of the handle to the rotor;
   a support part provided in the front portion of the reel body and supporting the driving part; and
   a magnetic seal device mounted in the cover body and including a magnet, a cylindrical magnetic body forming a magnetic circuit between the magnetic body and the magnet and magnetic fluid maintained between the magnet and the magnetic ring.

(10) The spinning reel according to (9), wherein the magnetic seal device is arranged on a surface substantially flush with the front surface of the cover body, as not to protrude over the surface.

(11) The spinning reel according to (10) further comprising a rolling type one-way clutch allowing the rotation of the driving part in one direction and preventing the rotation of the driving part in the other direction,
   wherein the magnetic body functions as an inner race of the one-way clutch.

(12) The spinning reel according to (9), wherein the rotor includes a pair of arms formed at opposite sides of the cylindrical portion of the rotor, and a curved reinforcing member connecting the cylindrical portion of the rotor and the pair of the arms.

DESCRIPTION OF PREFERRED EXEMPLARY EMBODIMENTS

Hereinafter, a fishing reel according to an exemplary embodiment is described in detail with reference to the accompanying drawings.

FIGS. 1 to 9 illustrate the spinning reel for fishing according to a first embodiment. A reel body 1 (made of, for example, metal) includes a reel foot 2 integrally formed with the reel body 1, a rotor 3 rotatably supported in the front of the reel body 1, and a spool 4 supported moveably back and forth in association with the rotation of the rotor 3.

Figure 1:
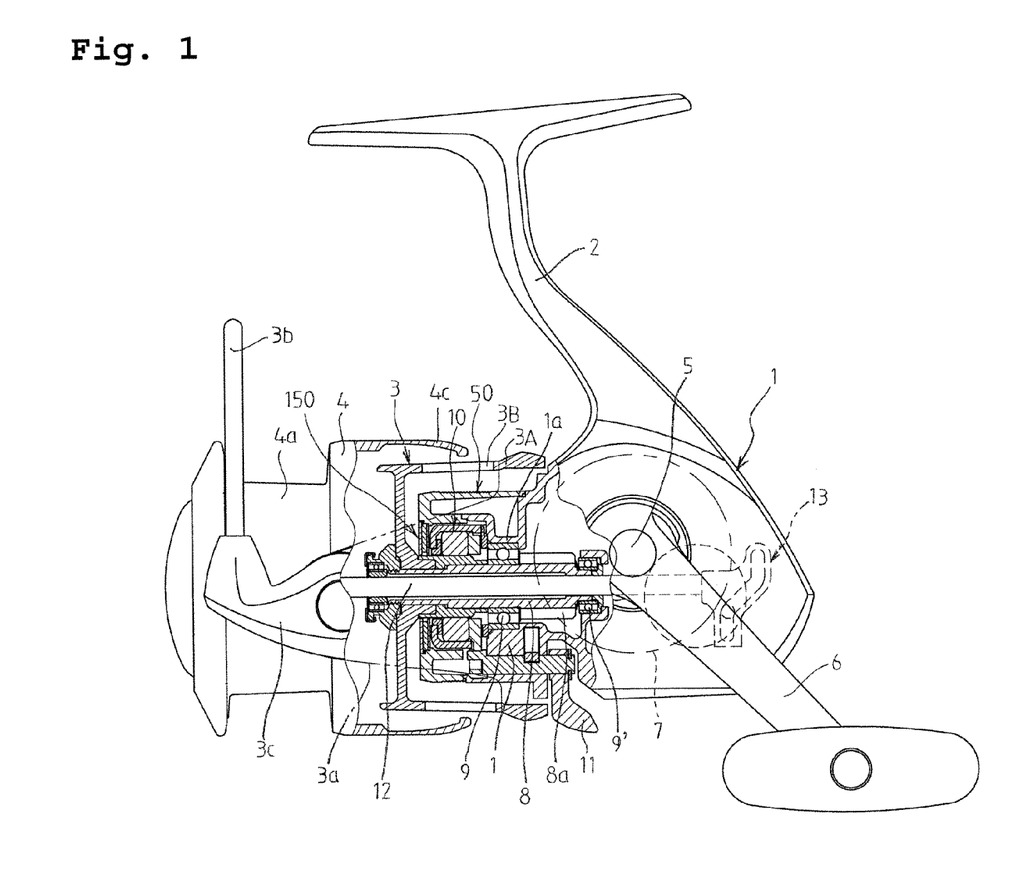
FIG. 1 is a side sectional view illustrating a spinning reel for fishing according to a first embodiment.

The rotor 3 includes a pair of arms 3a (only one is shown in FIG. 1) rotatable around the spool 4. Each arm 3a includes a bail support member 3c in the front end of the arm 3a in such a way that the bail support member 3c can freely rotate between a fishing line winding position and a fishing line releasing position. The bail support members 3c attaches the base ends of the bail 3b therewith. One base end of the bail 3b is attached to a fishing line guide part 3d (See FIG. 6) integrally provided with the bail support member 3c.

A handle axis 5 is rotatably supported in the reel body 1, and a handle is attached to the extruded end portion of the handle axis 5. Furthermore, a winding operation device is coupled to the handle axis 5. The winding operation device includes an operation gear 7 and a pinion 8. The operation gear 7 is integrally mounted to, and thus rotatable with, the handle axis 5. The pinion 8 includes a pinion teeth 8a engaged with the operation gear 7, and works as a rotational operation axis (driving part) extending in the direction perpendicular to the handle axis 5 and having a cavity, which extends in the axial direction, formed therein.

Figure 2:
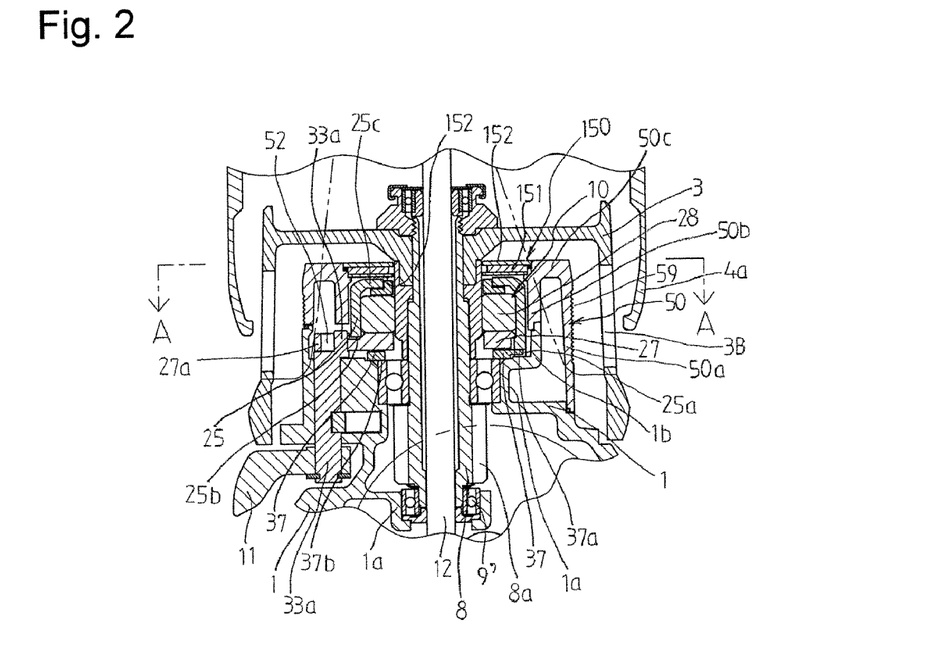
FIG. 2 is an enlarged sectional view of a principle part of the spinning reel for fishing of FIG. 1.
Figure 3:
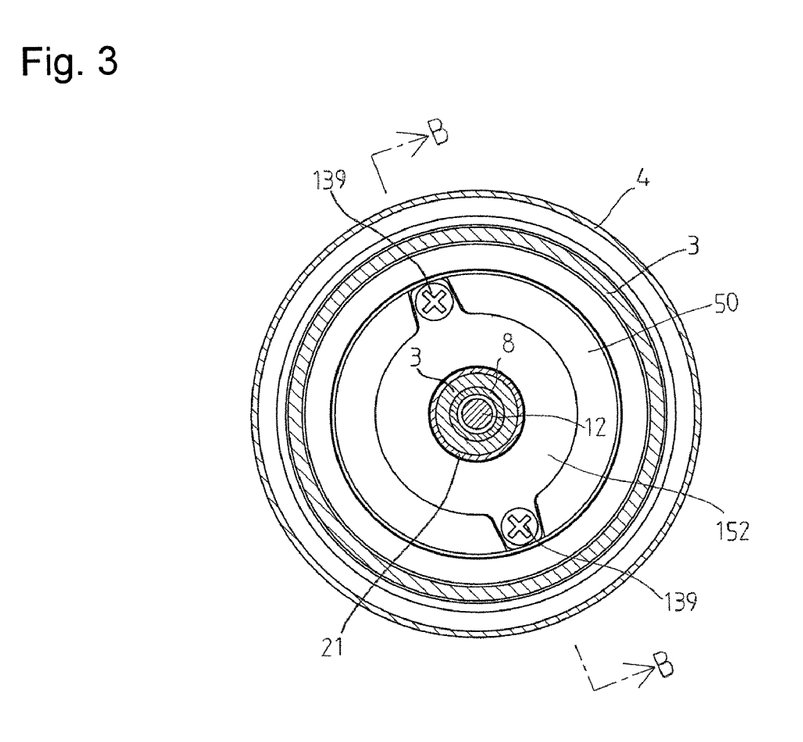
FIG. 3 is a sectional view of FIG. 2 taken along line A-A.

As clearly illustrated in FIG. 2, the pinion 8 is rotatably supported in the reel body 1 in such a way that the front and back portions of the pinion 8 with respect to the pinion teeth 8a are supported by bearings 9 and 9', which are fitted to a support portion 1a (a support portion provided in the front portion of the reel body 1) integrally formed with the reel body 1. Moreover, the pinion 8 extends towards the spool 4 and includes the rotor 3 attached to the front end of the pinion 8. Meanwhile, the bearing 9 located in front of the pinion teeth 8a has one end contacting with the front end of the pinion teeth 8a, and the other end retained in the axial direction by a retaining member 37 inserted between the bearing 9 and a rolling type one-way clutch 10 as explained below. The bearing 9' is axially fixed being fitted in between the back end of the pinion teeth 8a and the support portion 1a of the reel body 1.

The rolling type one-way clutch 10 is attached (arranged) on the pinion 8 ahead of the bearing 9 located in front of the pinion teeth 8a. The rolling type one-way clutch 10, which is operated by the rotational manipulation of a switching operation lever 11 provided outside of the reel body 1, works as a well-known anti-reverse device (stopper) to prevent a backlash of the handle 6 (the rotor 3) in the fishing line releasing direction.

The cavity formed inside the pinion 8 includes a spool axis 12 passing though the cavity in such a way that the spool axis 12 is moveable in the axial direction. The spool 4 is mounted onto the front end of the spool axis 12. Moreover, the pinion 8 includes a well-known spool adjustment device 13 coupled thereto in order to move the spool 4 (the spool axis 12) back and forth.

In the spinning reel for fishing with these configurations, when the winding operation is performed with the handle 6, the spool 4 moves back and forth by the spool adjustment device 13 as the rotor 3 is rotated by the winding operation device. Thus, the fishing line can be uniformly reeled in a winding body 4a of the spool 4 via the fishing line guide part mentioned above.

As shown in FIG. 2, the rolling type one-way clutch 10 includes an inner race 21 fitted unrotatably with respect to the pinion 8, a support unit 27 arranged outside the inner race 21, and an outer race 25 arranged outside the support unit 27. The rolling type one-way clutch 10 is surrounded, and thus protected, by a protection cover (ring-shaped cover body) 50 having substantially a pipe shape (substantially a ring shape) as described below.

The inner circumferential surface of the outer race 25 is formed with a free rotation region, in which a plurality of rolling members 28 supported by the support unit 27 can rotate freely, and a wedge region, in which the rotation of the plurality of rolling members 28 is prohibited. Each rolling member 28 is pressed toward the wedge region by a spring member provided in the support unit 27.

The outer race 25 has substantially a pipe shape, and includes a block end portion 25c substantially blocked by the penetration of the pinion 8 with respect to the outer race 25, and a open end portion 25b on the opposite side. The retaining member 37 inserted between the bearing 9 and the rolling type one-way clutch 10 prevents the outer race 25 from rotating around the reel body 1. Specifically, for example, the retaining member 37 having a circular ring shape is provided, at a portion of the retaining member 37 in a circumferential direction, with a plurality of coupling portions 37a extruding radially and being arranged at intervals in a circumferential direction. These coupling portions 37a are locked with an anti-rotation locking portions 25a having a notch shape and being arranged at the corresponding locations of the outer race 25. Further, a screw attached to the coupling portions is coupled to the reel body 1, and thus the outer race 25 is unrotatable with respect to the reel body 1 via such coupling portions. Meanwhile, in the present embodiment, the outer race 25 is arranged to make the open end portion 25 b face the bearing 9. Thus, in the present embodiment, the retaining member 37 is fitted within the cylindrical outer race 25 via the open end portion 25b (See FIG. 2). In this configuration, the ring-shaped retaining member 37 retains the bearing 9 axially by making a retaining part 37b, which is arranged inside the circumference of the retaining member 37, contact with a outer race 9a of the bearing 9.

In these configuration of the one-way clutch 10, when the inner race 21, accompanied by the pinion 8, rotates in a positive direction (i.e., when the rotor 3 rotates in a fishing line winding direction), the rolling members 28 of the support unit 27 is located at the free rotation region of the outer race 25. Thus, the rotational force of the inner race 21 is not transmitted to the outer race 25 (i.e., the inner race 21 is not hindered by the outer race 25). Therefore, the rotor 3, accompanied by the pinion 8, can rotate freely. By contrast, when the inner race 21, together with the pinion 8, is attempted to rotate in a negative direction (i.e., when the rotor 3 rotates in a fishing line releasing direction), the rolling member 28 of the support unit 27 is placed at the wedge region of the outer race 25, and the rotational force of the inner race 21 is delivered to the outer race 25, thereby playing a function as a stopper. Thus, the rotation (reverse rotation) of the pinion 8 and the rotor 3 is prevented.

The operation of the anti-reverse device with the one-way clutch 10 is designed to be shifted by the switching operation lever 11. Specifically, as shown in FIG. 2, the switching operation lever 11 includes a switching cam 33 extending substantially in parallel with the spool axis 12 in the reel body 1, and a front end extrusion portion 33a of the switching cam 33 is coupled to a coupling hole 52 of an extension portion 27a extending radially of the support unit 27. Therefore, in this configuration, the rotation of the support unit 27 via the switching cam 3 by the rotational operation of the switching operation lever 11 allows shifting selectively between a reversible position in which the rolling member 28 supported by the support unit 27 is forced to remain in the free rotation region of the outer race 25 against the pressure of the spring member (i.e., the position where the rotor 3 is rotatable reversely), and an anti-reverse position in which the rolling member 28 is forced to be arranged in the wedge region by the pressure of the spring member (i.e., the position where the reverse rotation of the rotor 3 is prevented).

Figure 4:
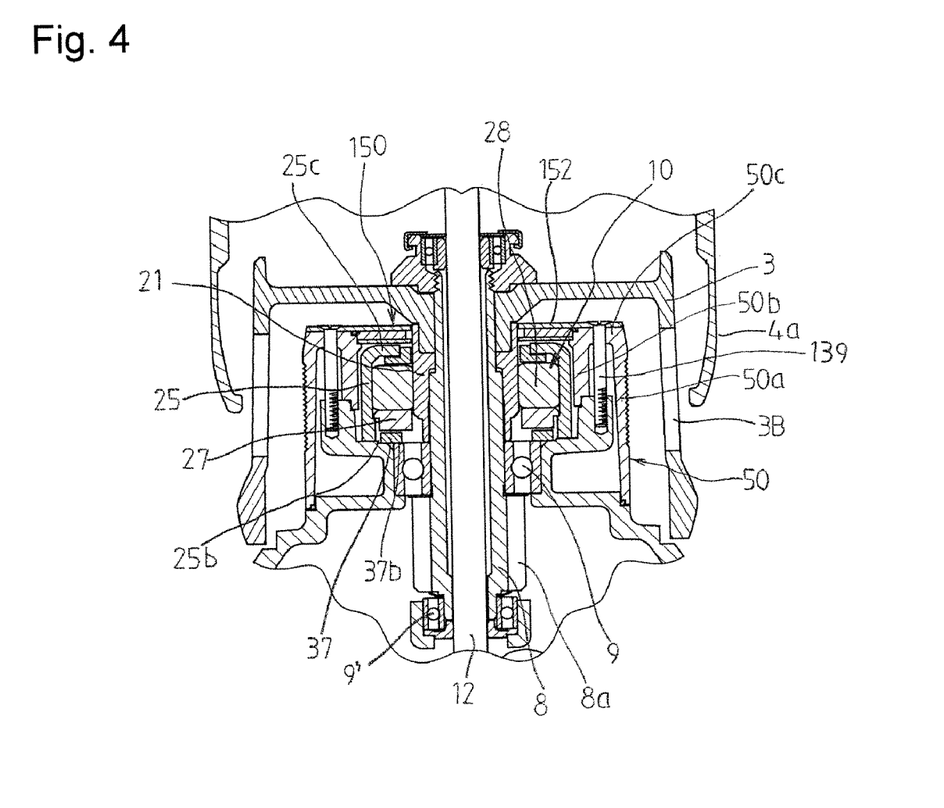
FIG. 4 is a sectional view of FIG. 3 taken along line B-B.
Figure 5:
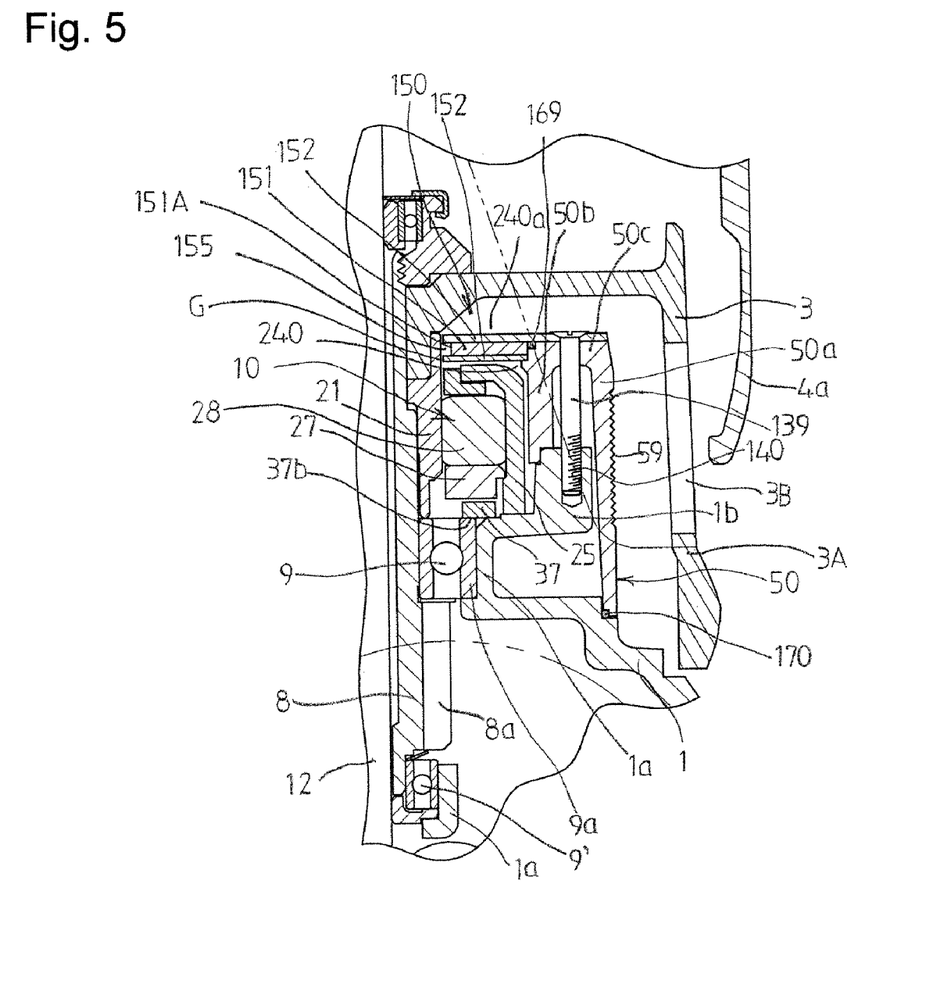
FIG. 5 is an enlarged sectional view of a principle part of FIG. 4.

As clearly illustrated in FIGS. 4 and 5, the protection cover (ring-shaped cover body) 50 is made of resin with coating, and is detachably attached to the reel body 1. Specifically, the protection cover 50 includes an outer surrounding portion (outer circumferential wall mounted in the front portion of the reel body 1) 50a arranged outside in the radial direction, an inner surrounding portion (inner circumferential wall mounted in the front portion of the reel body 1) arranged inside in the radial direction, and a front end connecting portion 50c connecting the surrounding portions 50a and 50b. A bolt 139, which is removably inserted from the front end connecting portion 50c, is introduced into the space between the outer surrounding portion 50a and the inner surrounding portion 50b, and then is screw-coupled to a screw hole 140 arranged in the end portion of an extension portion 1b of the reel body 1 extending at the outer circumferential side of the one-way clutch 10. Thus, the protection cover 50 is detachably attached to the reel body 1 in a hollow screw type. In this case, the bolt 139 is screwed to the screw hole 140 until the end surface of the inner surrounding portion 50b makes contact with the end surface of the extension portion 1b of the reel body 1. Accordingly, the reel body 1 is provided with an accommodating recess 240 having a concave shape and accommodating partially the pinion 8 (and/or the inner race 21 rotatable integrally with the pinion 8), which works as an operation member associated with, and thus rotatable by, the manipulation of the handle 6. Moreover, the accommodating recess 240 accommodates, and supports, the one-way clutch 10 therein in a positioning state, and has an opening 240a in the front side facing the spool 4. The opening 240a is provided with a magnetic seal device 150, as described below, for sealing the opening 240a in order to prevent the inflow of moisture or foreign matters into the opening 240a.

Moreover, a seal member 170, such as an O-ring is inserted between the end surface of the outer surrounding portion 50a and the reel body 1. Further, a plurality of ridges 59 are formed axially to provide an easy grip when the protection cover 50 is attached to, or detached from, the reel body 1.

The magnetic seal device 150 for sealing the accommodating recess 240 is configured as a unit including a magnet 151 arranged to surround the pinion 8 at a particular distance, a support member (magnetic ring) 152 for supporting the magnet 151, the inner race 21, and a magnetic fluid 155 maintained between the magnet 151 and the inner race 21. The inner race 21 works as a magnetic body having a pipe shape and forming a magnetic circuit between the inner race 21 and the magnet 151 (thus, having an axial length at least against the support member 152) by being inserted to the one-way clutch 10, while being unrotatably fitted to the pinion 8. That is to say, in the present embodiment, the cylindrical magnetic body constituting the magnetic seal device 150 also works as the inner race 21 of the one-way clutch.

The magnet 151 has a ring shape with a predetermined thickness, and is formed to include the pinion 8 passed therethough. The support member 152 is configured to maintain the magnet 151 by sandwiching the magnet 14 from both sides of the magnet 14.

Moreover, the support member 152 maintains the ring-shaped magnet 151 by sandwiching it, and is arranged to generate a concave portion 151A along the inner circumference of the magnet 151. The support member 152, together with the magnet 151, is supported by the protection cover 50. Specifically, the support member 152 is maintained by being fitted in between the head of the bolt 139, with which the support member 152 is in surface-to-surface contact at its one side, and the end portion of the protection cover 50, with which the support member 152 is in surface-to-surface contact at its other side. Between the protection cover 50 and the support member 152 is a seal member 169 inserted. The support member 152 is formed to make a gap G from the outer surface of the inner race 21, which works as a magnetic body.

The inner race 21, as a magnetic body, is made of a metallic material, such as steel, SUS430, SUS440C, or SUS630. Accordingly, the magnet 151 foams a magnetic circuit between the support member 152 and the inner race 21, both maintaining the magnet 151.

The magnetic fluid 155 is made by dispersing magnetic particles such as $Fe_3O_4$ to surfactant and base oil. The magnetic fluid 155 has viscosity and reacts to the magnet 151 approached. Accordingly, the magnetic fluid 155 is stably maintained within the concave portion 151A and within the gap G, thereby sealing the opening 240a, by the magnetic circuit formed by the magnet 151, the support member 152 maintaining the magnet 151, and the inner race 21 working as a magnetic body.

As described above, in the present embodiment, the magnetic seal device 150 is provided in the front portion of the protection cover (cover body) 50, though which the pinion 8 as a driving part passes. Furthermore, the magnetic seal device 150 is arranged not to protrude over a surface flush with the front surface of the protection cover 50, as clearly illustrated in FIGS. 4 and 5, and especially in FIG. 8.

In the present embodiment, the rotor 3 includes a body portion (cylindrical portion) 3A and a pair of arm 3a mentioned above. The body portion 3A has substantially a cylindrical shape, and accommodates the front portion of the reel body 1 (Such accommodation is illustrated in FIG. 1). The arms 3a are arranged in both sides of the rotor 3 at 180 degree angle. As clearly illustrated in FIG. 6, each arm 3a is integrally formed with the body portion 3A though a connecting portion 3a' extruding radially from the back portion (the side toward the reel body) of the body portion 3A. Each arm 3a also extends axially. Accordingly, a gap is formed between the body portion 3A and each arm 3a, and a skirt portion 4c of the spool 4 is located in this gap, as shown in FIG. 1.

Figure 6:
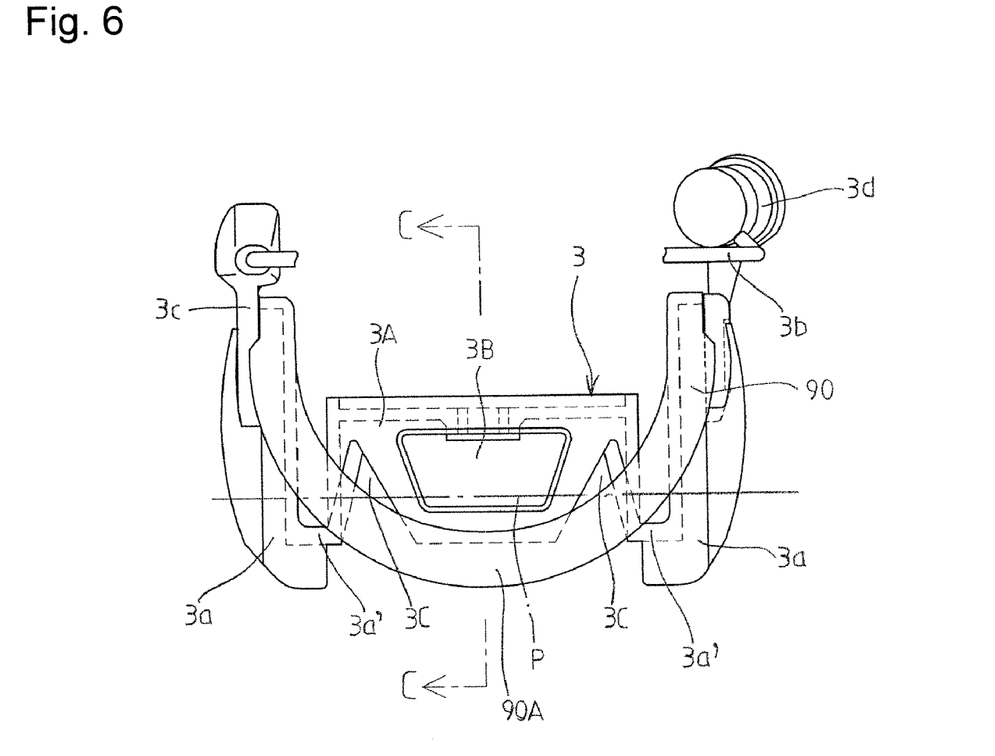
FIG. 6 is a side view illustrating the portion of the rotor of the spinning reel of FIG. 1.
Figure 7:
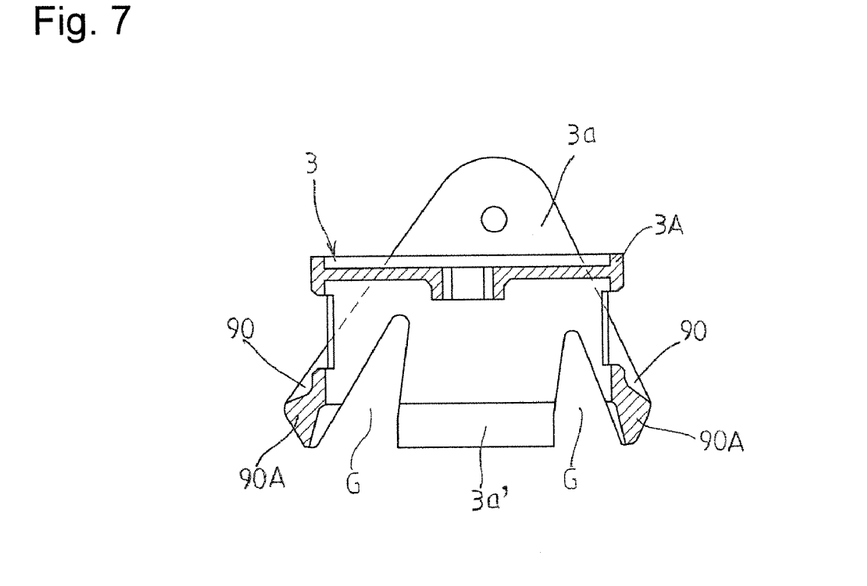
FIG. 7 is a sectional view of FIG. 6 taken along line C-C.
Figure 8:
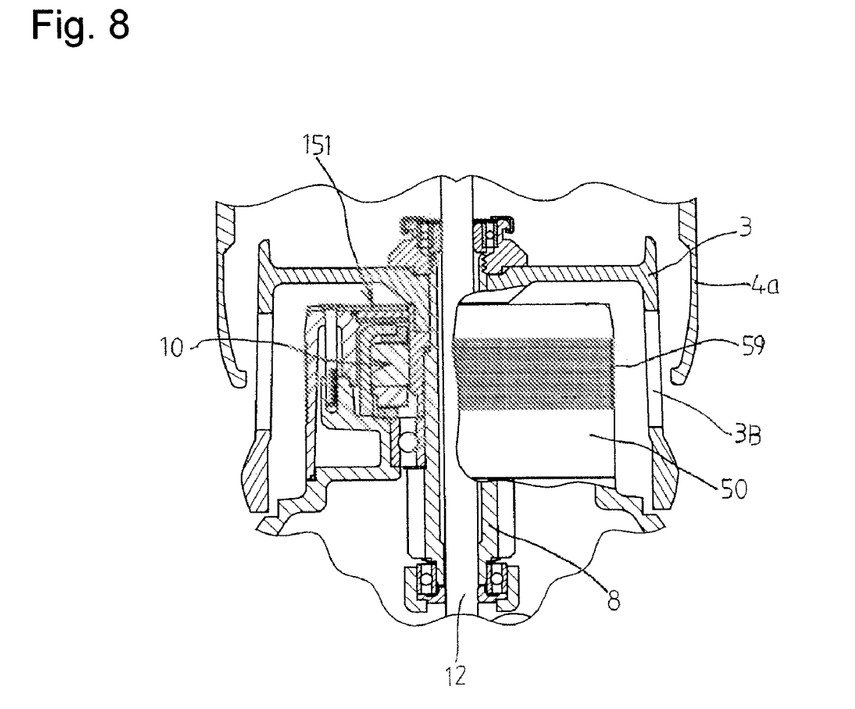
FIG. 8 is a sectional view corresponding to FIG. 4 and illustrating in detail the configuration in which the magnetic seal device is arranged not to protrude over a surface substantially flush with the front surface of the cover body.
Figure 9:
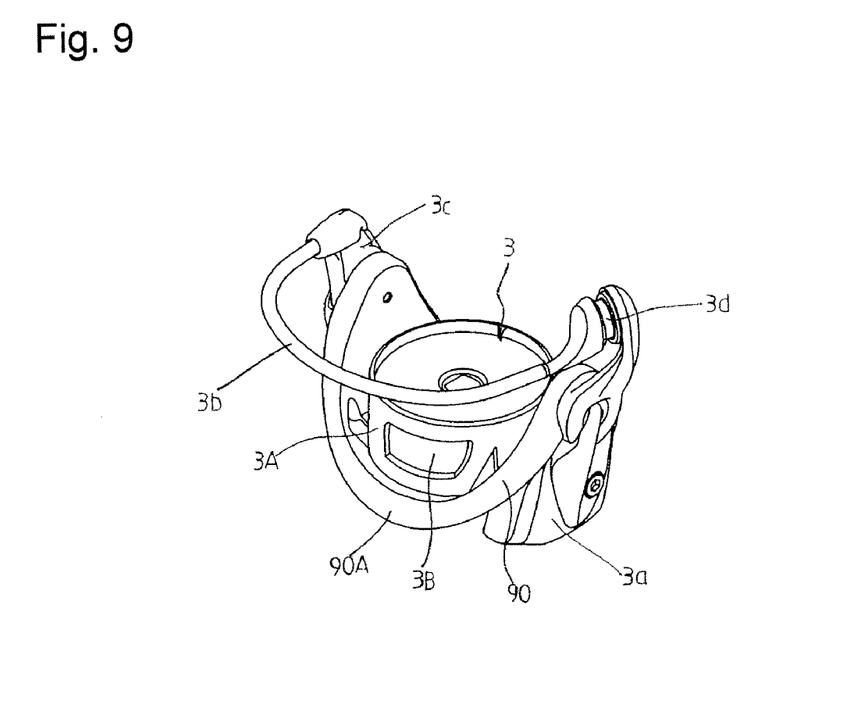
FIG. 9 is a schematic view illustrating the portion of the rotor of the spinning reel of FIG. 1.

The pair of arms 3a are provides with a reinforcing member 90. As illustrated in FIGS. 6 and 7, the reinforcing members 90 extend from the sides of the pair of arms 3a to the back portion of the body portion 3A, and are connected to the body portion 3A. It is preferable to arrange the reinforcing members 90 in both sides of each arm 3a. The reinforcing members 90 provided in both sides have substantially the same shape, and extend from the front portion (the portion provides with the support member 3c) of the sides of the arm 3a toward the base portion. The reinforcing members 90 are gradually more apart as they go to the base portion. In other words, both arms 3a are formed substantially in a tapered shape when viewed laterally in the direction in which both arms 3a face, and thus both sides at the base portion of the aims 3a have a gap G from the reinforcing member 90. The gap G expands gradually when viewed from the side.

In the present embodiment, the reinforcing member 90 is built between the pair of arms 3a, as illustrated in FIG. 6, and a intermediate portion 90A of the reinforcing member 90 is connected, by integral forming, to the back portion of the body portion 3A of the rotor 3 (See FIG. 7). Therefore, the reinforcing member 90 is continuously formed, without any split, between the pair of arms 3a, and is curved in a convex shape towards the reel body 1.

In the present embodiment, as illustrated in FIG. 6, the reinforcing member 90 has a curved shape towards the reel body between the pair of arms 3a. At least the lowest portion (the region of the intermediate portion 90A) is arranged closer to the reel body than the back edge (the line referred to as P) of the skirt portion 4c of the spool 4, when the spool 4 moves axially towards the reel body to the utmost. More specifically, as shown with line P, it is formed in such a way that portions of both sides of the back end of the skirt 4c are overlapped when the spool 6 moves towards the reel body at the utmost. Thus, although the spool 4 moves back and forth, the state in the movement can be easily recognized by a user without any interception of the reinforcing member 90.

According to this configuration, since the reinforcing member 90 is connected between the sides of the arms 3a and the back of the body portion 3A of the rotor 3, stress is dispersed through the reinforcing member 90 although a big load is exerted on the arms 3a by the tension of the fishing line. Thus, the distortion of the arms, for example, is prevented. Moreover, as illustrated in FIG. 7, such an opening as the gap G can be suitably provided by the girder-type structure of the reinforcing member 90, without an increased thickness of the base portion of the arms 3a, and thus the weight can be reduced as much as possible while the strength of the arms is not diminished.

In addition to these configuration, the present embodiment forms openings, such as an opening 3B penetrating axially and a notch opening 3C, in the body portion 3A of the rotor 3. The opening 3B has a rectangular shape and is arranged at a location facing at ninety degree angle against the location at which the arm 3a is formed. The triangle-shaped notch opening 3C is formed at both sides of the opening 3B. As such, the opening like the opening 3B or the notch opening 3C is formed at a location other than the location at which the anus are formed, in order not to reduce the strength of the arms 3a. Moreover, the intermediate portion 90A of the reinforcing member 90 is integrally connected to the lower end portion of the opening 3B.

As described above, the spinning reel for fishing according to this embodiment can reduce not only the weight of the rotor 3 (achieving the lightweight of the rotor 3) thanks to the opening 3B (the notch opening 3C) provided in the rotor 3, but also the seal resistance by adopting the magnetic seal device 150 instead of a conventional seal device with frictional resistance (i.e. the synergy effect of the reduced weight of the rotor and the reduced seal resistance). Thus, the moment of inertia of the rotor 3 is reduced, and thus the rotational performance of the rotor 3 can be improved. Furthermore, thanks to this improvement of the moment of inertia, the sensitivity in the manipulation between the rotation and the stop of the rotor 3 can be greatly improved compared to prior arts, and thus the nibble sensitivity is highly improved because it is possible to more sensitively react to the variation in the tension of a fishing line.

In the present embodiment, the magnetic seal device 150 can be effectively and efficiently installed because it is mounted to the front of the protection cover 50 through which the pinion 8 passes. Furthermore, the seal space is effectively formed by the protection cover 50 including the surrounding walls 50a and 50b, and thus the seal effect is greatly improved by a synergy effect with the magnetic seal device 150.

In the present embodiment, the reel body 1 can be made in a compact form in the axial direction because the magnetic seal device 150 is arranged so as not to protrude on a surface substantially flush with the front surface of the protection cover 50. Accordingly, the reel body 1 can be reduced in size as well as in weight, and thus the moment of inertia of the rotor can be additionally reduced.

In the present embodiment, the cylindrical magnetic body belonging to the magnetic seal device 150 plays an additional function as the inner race 21 of the one-way clutch, thereby reducing the number of components. Thus, the reel body 1 can be reduced in weight, and the moment of inertia of the rotor can be additionally reduced.

Figure 10:
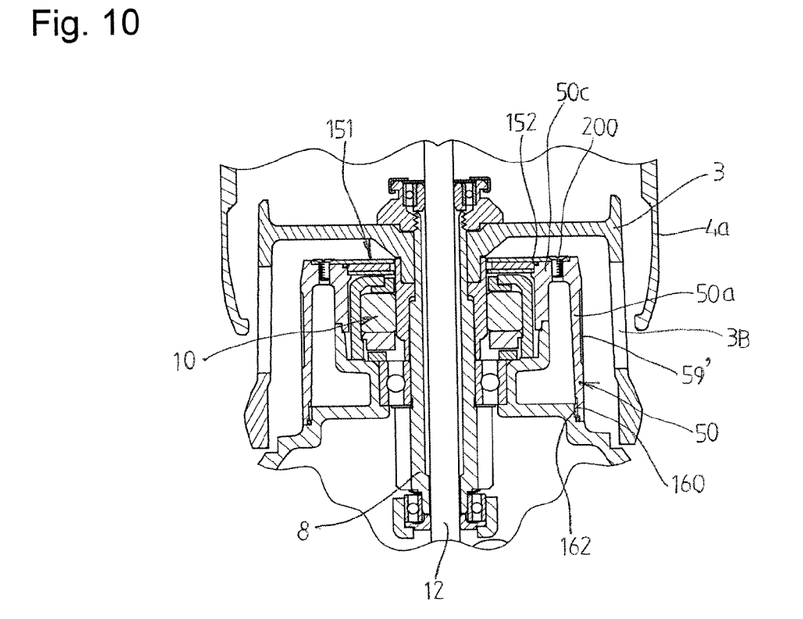
FIG. 10 is a sectional view corresponding FIG. 4 and illustrating a spinning reel for fishing according to a second embodiment.
Figure 11:
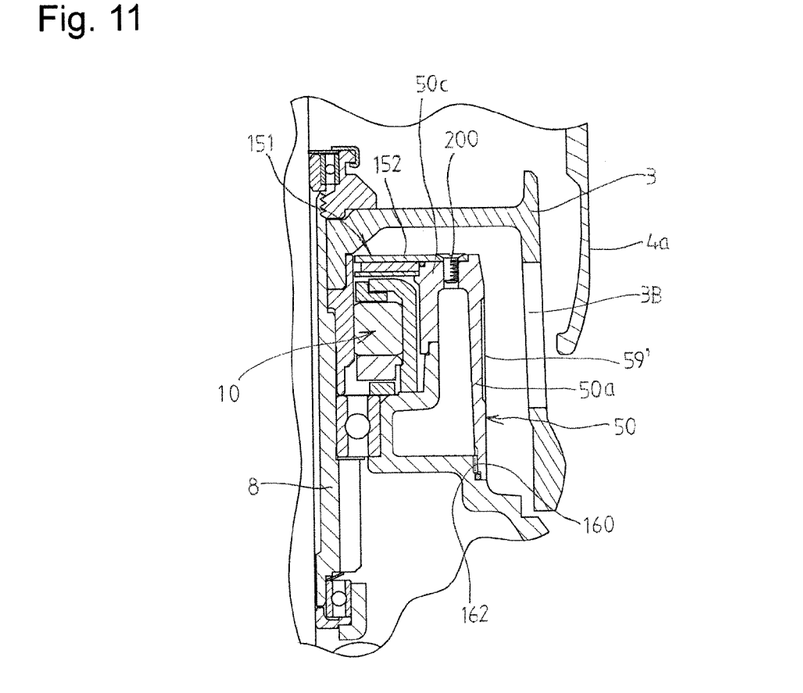
FIG. 11 is an enlarged sectional view of a principle part of FIG. 10.
Figure 12:
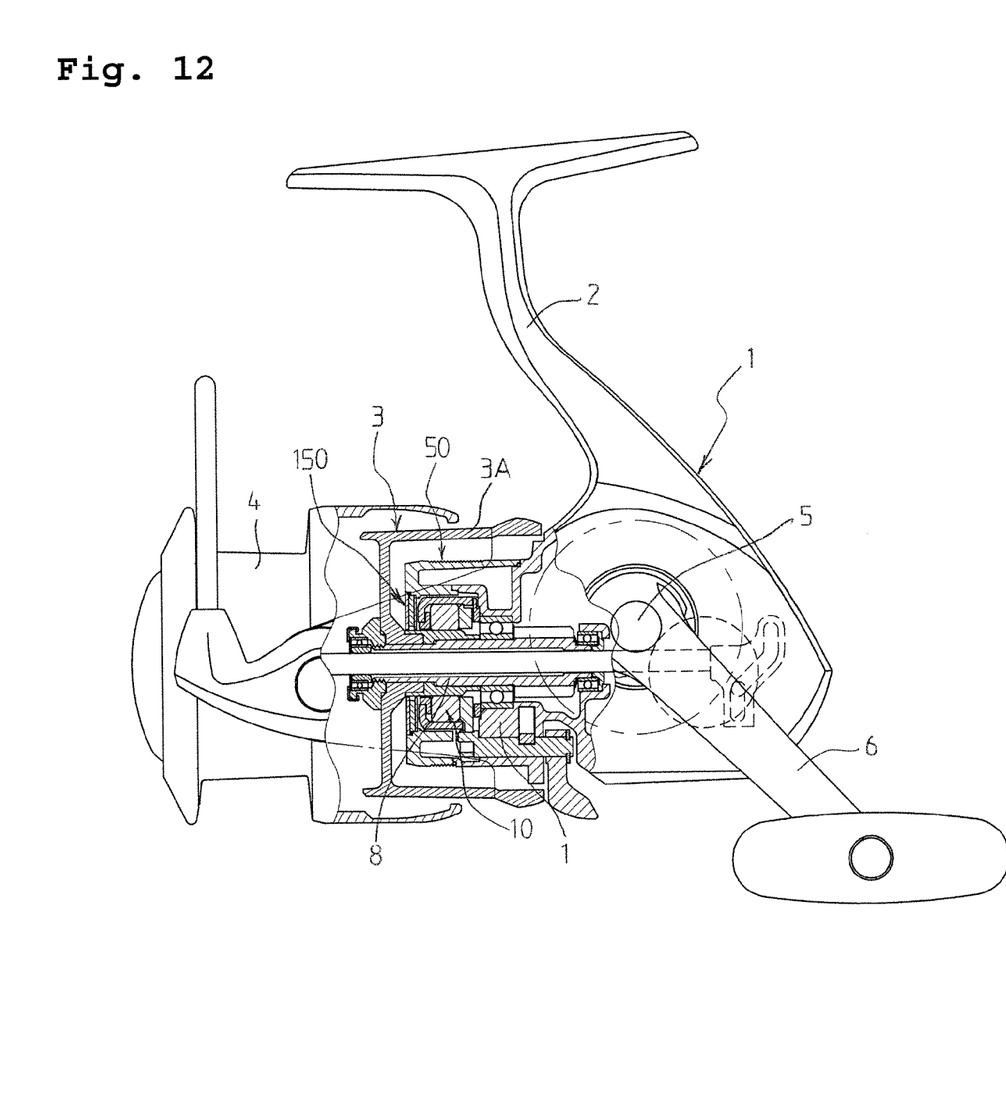
FIG. 12 is a side view corresponding to FIG. 1, and illustrating the spinning reel for fishing without an opening in the body portion of the rotor.
Figure 13:
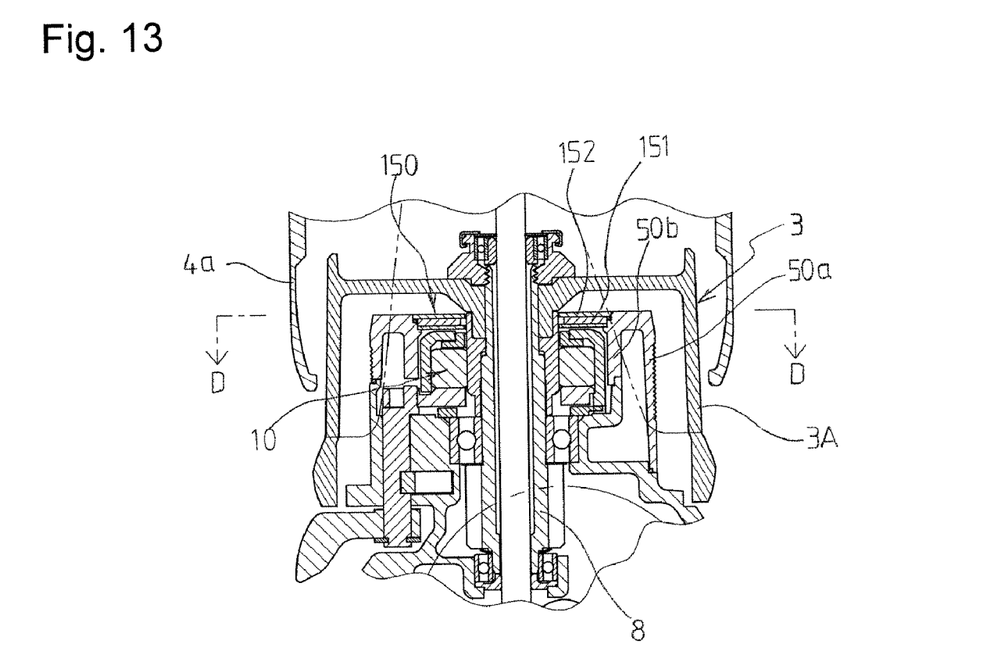
FIG. 13 is an enlarged sectional view corresponding to FIG. 2 and illustrating a principle part of the spinning reel of FIG. 12.
Figure 14:
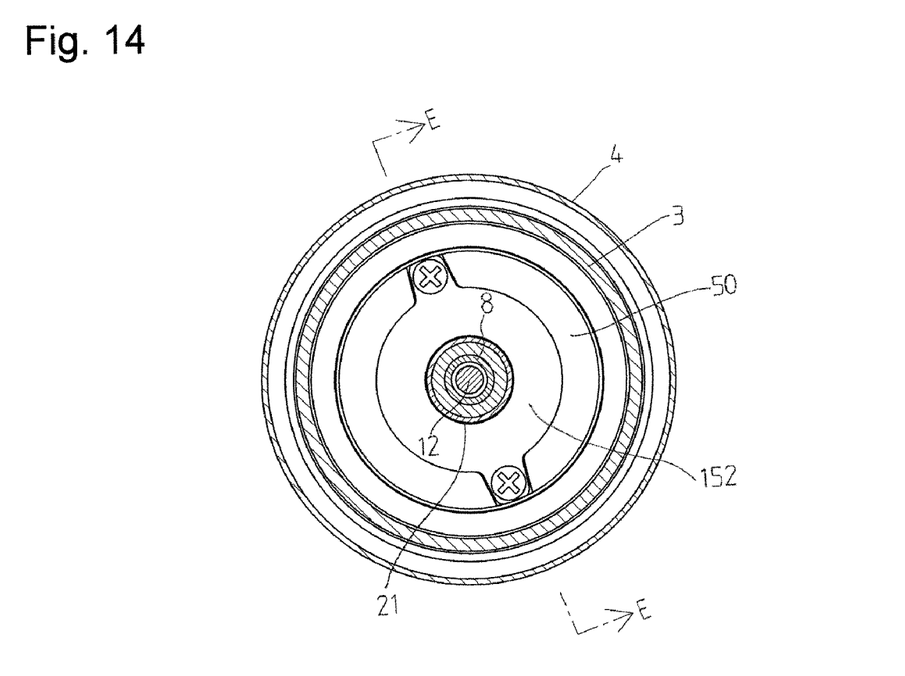
FIG. 14 is a sectional view of FIG. 13 taken along the line D-D.
Figure 15:
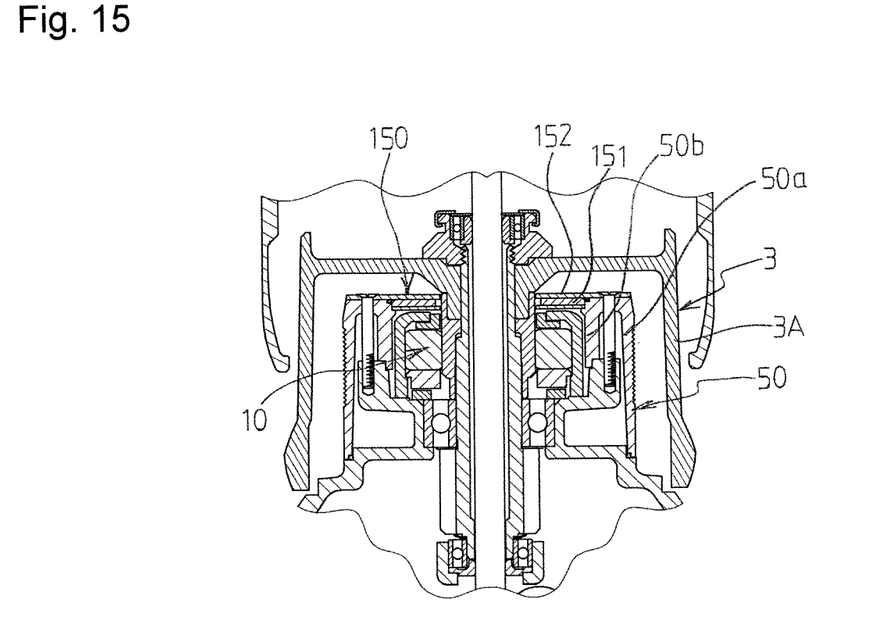
FIG. 15 is a sectional view of FIG. 14 taken along the line E-E.
Figure 16:
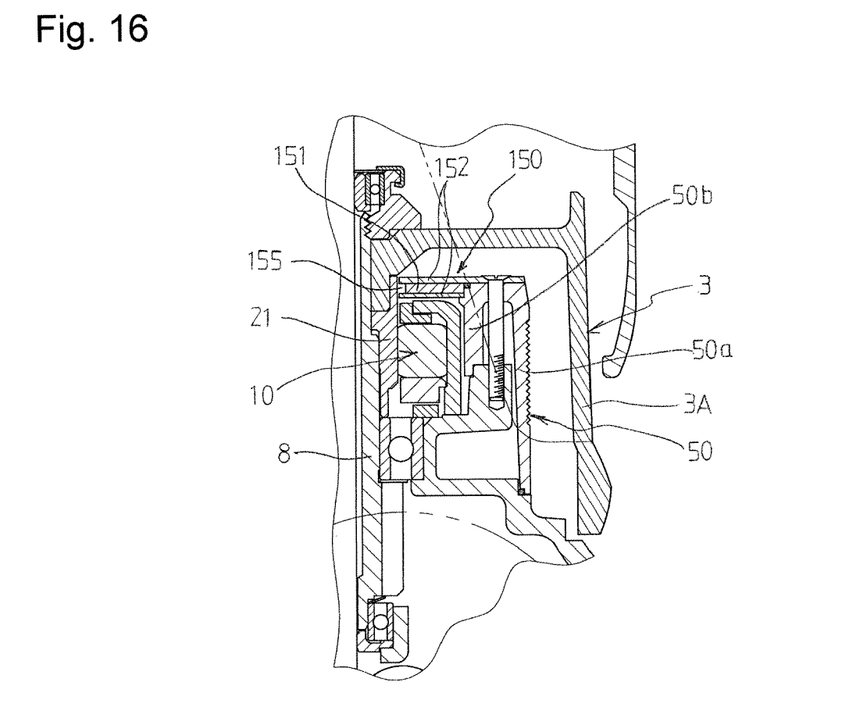
FIG. 16 is an enlarged sectional view illustrating a principle part of FIG. 15.
Figure 17:
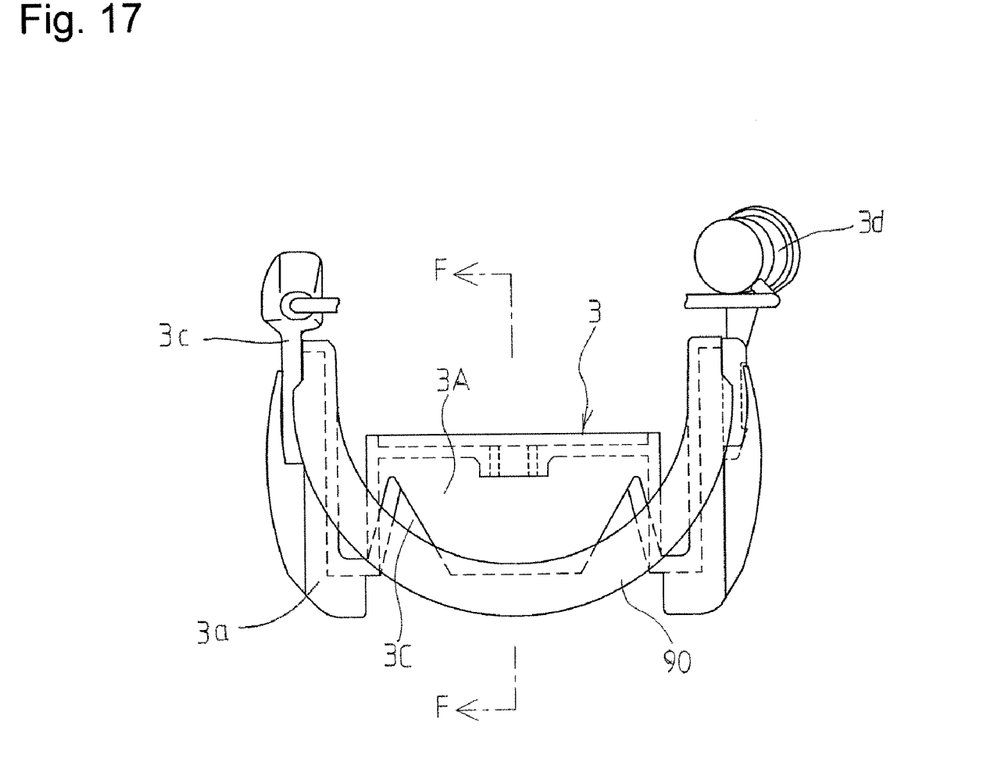
FIG. 17 is a side view corresponding to FIG. 6 and illustrating the rotor portion of the spinning reel for fishing of FIG. 12.
Figure 18:
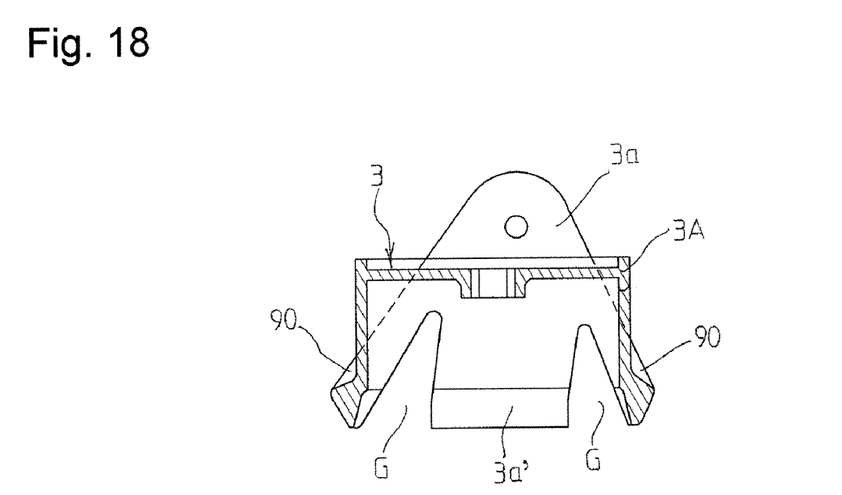
FIG. 18 is a sectional view of FIG. 17 taken along line F-F.
Figure 19:
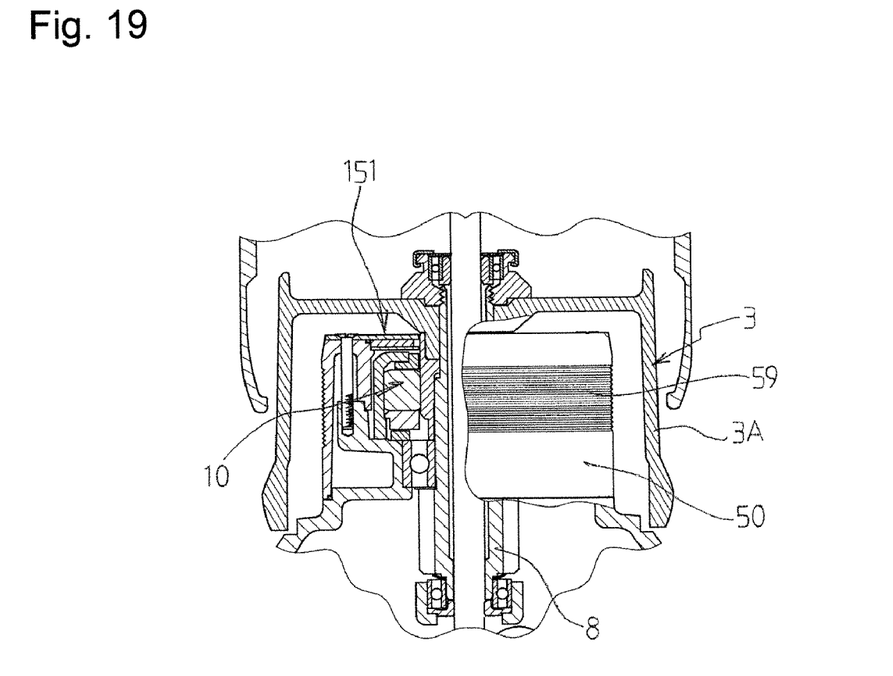
FIG. 19 is a sectional view corresponding to FIG. 15 and illustrating in detail the structure where the magnetic seal device is arranged not to protrude over a surface substantially flush with the front surface of the cover body.
Figure 20:
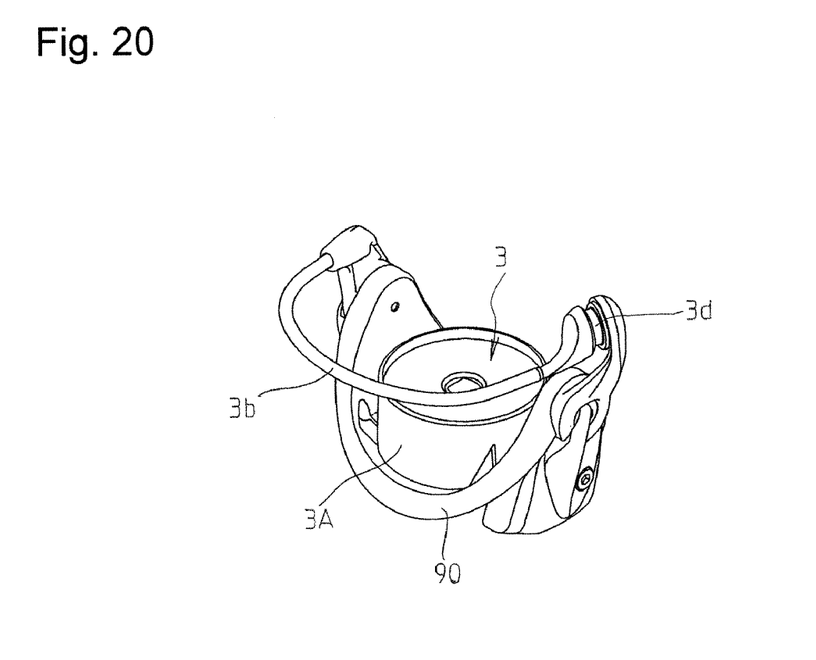
FIG. 20 is a schematic view of the rotor portion of the spinning reel of FIG. 12.

FIGS. 10 and 11 illustrate a spinning reel for fishing according to the second exemplary embodiment. In the spinning reel according to this embodiment, instead of the ridges 59 on the outer circumferential surface of the outer surrounding portion 50a, a knurling process 59' is performed axially on the outer circumferential surface of the outer surrounding portion 50a in order to provide an easy rotational manipulation by hand. Moreover, the protection cover 50 is detachably attached to the reel body 1 by screw-coupling a female screw 160 at the end of the outer surrounding portion 50a to a male screw 162 of the reel body 1. Furthermore, the support member 152 at the front of the magnetic seal device 150 is attached by a bolt 200 to the front end connecting portion 50c of the protection cover 50, and, thus, the magnetic seal device 150 can be made in a unit (excluding the inner race 21). The remaining configurations are identical to those in the first embodiment. Therefore, the structure according to the second embodiment can achieve the same technical effects as in the first embodiment.

While the embodiments described above include the opening 3B in the body portion 3A, which is the cylindrical portion of the rotor 3, FIGS. 12 to 20 illustrate the structure of a spinning reel for fishing including a body portion 3A without the opening 3B. This structure shows the utility of the protection cover (cap-shaped cover body) 50 itself to the body portion 3A without the opening 3B. The structures in FIGS. 12 to 20 are identical to those in the first embodiment, except that the body portion 3A does not have the opening 3B. Thus, although the further explanation is replaced with the same reference numbers in the drawings, it is clear from the drawings that the cap-shaped cover body (protection cover) including surrounding walls 50a and 50b and mounting the magnetic seal device 150 therein can prevent an unnecessary adhesion of the magnetic member, and prohibit the rotational performance of the rotor 3 or the deterioration in the sealing effect. Moreover, the seal device 150 or the one-way clutch 10 can be accommodated in a compact form, and, thus, the entire reel can be reduced in size.

What is claimed is:

1. A spinning reel for fishing comprising:
a reel body including a front portion;
a handle provided in the reel body;
a spool on which a fishing line is to be wound;
a rotor that includes a cylindrical portion accommodating the front portion of the reel body and a fishing line guide part, the rotor being rotated by the rotational manipulation of the handle to wind the fishing line on the spool, an opening being formed radially through the cylindrical portion of the rotor;
a driving part transmitting the rotation of the handle to the rotor;
a support part provided in the front portion of the reel body and supporting the driving part; and
a magnetic seal device arranged between the driving part and the support part.

2. The spinning reel according to claim 1 further comprising a cap-shaped cover body including a surrounding wall mounted in the front portion of the reel body,
wherein the magnetic seal device is mounted in a front portion of the cover body, and
wherein the driving part passes through the front portion of the cover body.

3. The spinning reel according to claim 2, wherein the magnetic seal device is arranged on a surface substantially flush with the front surface of the cover body, as not to protrude over the surface.

4. The spinning reel according to claim 3, wherein the magnetic seal device includes a magnet, a cylindrical magnetic body forming a magnetic circuit between the magnetic body and the magnet and magnetic fluid maintained between the magnet and the magnetic ring.

5. The spinning reel according to claim 3 further comprising a rolling type one-way clutch allowing the rotation of the driving part in one direction and preventing the rotation of the driving part in the other direction,
wherein the magnetic body functions as an inner race of the one-way clutch.

6. The spinning reel according to claim 1, wherein the opening of the rotor has a rectangular shape.

7. The spinning reel according to claim 1, wherein the rotor includes a triangle-shaped notch opening.

8. The spinning reel according to claim 1, wherein the rotor includes a pair of arms formed at opposite sides of the cylindrical portion of the rotor, and a curved reinforcing member connecting the cylindrical portion of the rotor and the pair of the arms.

9. A spinning reel for fishing comprising:
a reel body including a front portion;
a handle provided in the reel body;
a cap-shaped cover body including a surrounding wall mounted in the front portion of the reel body;
a spool on which a fishing line is to be wound;
a rotor including a fishing line guide part, the rotor being rotated by the rotational manipulation of the handle to wind the fishing line on the spool;
a driving part passing through the cover body and transmitting the rotation of the handle to the rotor;
a support part provided in the front portion of the reel body and supporting the driving part; and
a magnetic seal device mounted in the cover body and including a magnet, a cylindrical magnetic body forming a magnetic circuit between the magnetic body and the magnet and magnetic fluid maintained between the magnet and the magnetic ring.

10. The spinning reel according to claim 9, wherein the magnetic seal device is arranged on a surface substantially flush with the front surface of the cover body, as not to protrude over the surface.

11. The spinning reel according to claim 10 further comprising a rolling type one-way clutch allowing the rotation of the driving part in one direction and preventing the rotation of the driving part in the other direction,
wherein the magnetic body functions as an inner race of the one-way clutch.

12. The spinning reel according to claim 9, wherein the rotor includes a pair of arms formed at opposite sides of the cylindrical portion of the rotor, and a curved reinforcing member connecting the cylindrical portion of the rotor and the pair of the arms.

* * * * *